United States Patent [19]

Arpin

[11] Patent Number: 5,075,410

[45] Date of Patent: * Dec. 24, 1991

[54] IMIDE/EPOXY THERMOSETTING COMPOSITIONS

[75] Inventor: Rene Arpin, Lyons, France

[73] Assignee: Rhone-Poulenc Chimie, Courbevoie, France

[*] Notice: The portion of the term of this patent subsequent to Feb. 26, 2008 has been disclaimed.

[21] Appl. No.: 614,000

[22] Filed: Nov. 13, 1990

Related U.S. Application Data

[63] Continuation of Ser. No. 420,723, Oct. 11, 1989, Pat. No. 4,996,285, which is a continuation of Ser. No. 141,718, Jan. 11, 1988, abandoned.

[30] Foreign Application Priority Data

Jan. 9, 1987 [FR] France ................. 87 00299

[51] Int. Cl.$^5$ .............. C08G 59/44; C08G 73/12
[52] U.S. Cl. ................... 528/96; 528/117; 528/322; 526/64; 264/211.24
[58] Field of Search ............ 528/117, 322, 96; 526/64; 264/211.24

[56] References Cited

U.S. PATENT DOCUMENTS

| | | | |
|---|---|---|---|
| 3,875,113 | 4/1975 | Lefebure et al. | 528/117 |
| 3,925,324 | 12/1975 | Gerard | 526/64 |
| 3,978,152 | 8/1976 | Gruffaz et al. | 528/322 X |
| 4,283,521 | 8/1981 | Jones | 528/322 X |
| 4,288,359 | 9/1981 | Graham | 528/117 X |
| 4,346,206 | 8/1982 | Takahashi et al. | 528/117 X |
| 4,374,214 | 2/1983 | Holub et al. | 528/117 X |
| 4,393,188 | 7/1983 | Takahashi et al. | 528/117 X |
| 4,421,907 | 12/1983 | Schmidt et al. | 528/128 |
| 4,435,560 | 3/1984 | Takahashi et al. | 528/117 X |
| 4,510,272 | 4/1985 | Loszewski et al. | 528/117 X |
| 4,579,916 | 4/1986 | Schmid et al. | 528/322 X |

FOREIGN PATENT DOCUMENTS

| | | |
|---|---|---|
| 956605 | 2/1950 | France . |
| 2165722 | 8/1973 | France . |
| 2201313 | 4/1974 | France . |
| 2542752 | 9/1984 | France . |

OTHER PUBLICATIONS

Chemical Abstracts 81, 137068v (1974).

*Primary Examiner*—John Kight, III
*Assistant Examiner*—Frederick Krass
*Attorney, Agent, or Firm*—Burns, Doane, Swecker & Mathis

[57] ABSTRACT

Novel thermosetting compositions, well adapted for the production, e.g., of molded and laminated shaped articles, are comprised of a copolymerizate of (a) at least one N,N'-bisimide, (b) at least one diprimary diamine, and (c) at least one epoxy resin.

13 Claims, No Drawings

IMIDE/EPOXY THERMOSETTING COMPOSITIONS

This application is a continuation of application Ser. No. 07/420,723, filed Oct. 11, 1989, now U.S. Pat. No. 4,996,285 which was a continuation of 07/141,718, filed Jan. 11, 1988 (now abandoned).

BACKGROUND OF THE INVENTION

1. Field of the Invention

The present invention relates to novel thermosetting polymeric compositions based on imide and epoxy groups.

2. Description of the Prior Art

It is known to this art to produce thermosetting compositions by reacting an N,N'-bisimide of an unsaturated dicarboxylic acid with a diprimary diamine. See French Patent No. 1,555,564. The resulting prepolymer may be employed in the form of a solution, suspension or powder, or else may be shaped by simply being cast while hot. In a second stage, curing of the prepolymer is effected by heating to temperatures on the order of 300° C., under pressure if desired.

These polymers may be converted into films or polycellular materials. They are of very special interest for the production of molded shaped articles in combination, if desired, with fibrous or powdered fillers or laminates based on inorganic fibers (single fibers, fiber cloth or non-wovens) such as, for example, carbon, boron or glass fibers.

SUMMARY OF THE INVENTION

A major object of the present invention is the provision of improved thermosetting compositions based on imide groups which are curable into resins having excellent heat stability and which exhibit enhanced impact strength vis-a-vis the prior art resins when they are converted into molded shaped articles, and enhanced interlamellar strength when they are converted into laminates.

Briefly, the present invention features novel thermosetting compositions comprising the copolymerizate, at a temperature between 90° C. and 200° C., of an N,N'-bisimide with a diprimary diamine and an epoxy resin, and wherein:

(a) the N,N'-bisimide is a compound of the formula:

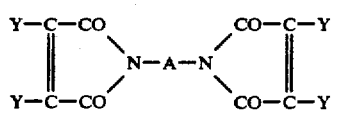
(I)

in which:
the symbol Y denotes H, $CH_3$ or Cl;
the symbol A denotes a divalent radical selected from among: cyclohexylene, phenylene, 4-methyl-1,3-phenylene, 2-methyl-1,3-phenylene, 5-methyl-1,3-phenylene, 2,5-diethyl-3-methyl-1,4-phenylene, and the radicals of formula:

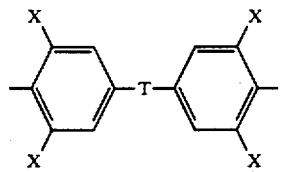

in which T denotes a single valence bond or a group:

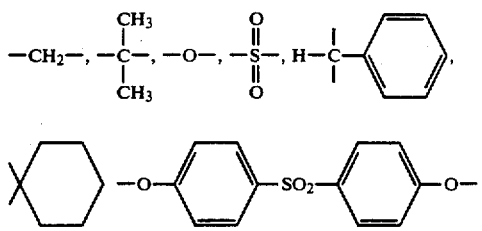

and the symbols X, which are identical or different, each denote a hydrogen atom or a methyl, ethyl or isopropyl radical;

(b) the diprimary diamine is a compound of the formula:

$$H_2\text{-N-B-NH}_2 \qquad \text{(II)}$$

in which the symbol B denotes one of the divalent radicals which are denoted above by the symbol A, with the proviso that the symbols A and B present in the same polymer may be identical to or different from each other; and (c) the epoxy resin has an epoxy equivalent weight of from 100 to 500, and characteristically comprises a glycidyl ether produced by reacting, with epichlorohydrin, a divalent phenol selected from among 2,2-bis(4-hydroxyphenyl)propane, bis(4-hydroxyphenyl)methane, bis(4-hydroxyphenyl)methylphenylmethane, bis(4-hydroxyphenyl)tolylmethanes, resorcinol, hydroquinone, pyrocatechol, 4,4'-dihydroxydiphenyl, or a product of condensation of any of the above-mentioned phenols with an aldehyde, or derivatives of the above phenols which are chlorinated or brominated on the aromatic nuclei thereof.

Also, (d) the amount of N,N'-bisimide of formula (I) and of diamine of formula (II) is selected such that the ratio:

ranges from 1.2/1 to 20/1; the amount of epoxy resin represents 10% to 40% of the weight of the combined mixture of bisimide+diamine+epoxy resin; and, in the case where a chlorinated or brominated epoxy resin is present, the amount of chlorine or bromine contributed by the epoxy resin, expressed as the weight percentage of elemental chlorine or elemental bromine relative to the weight of the combined mixture of bisimide+diamine+epoxy resin, represents not more than 6%; and (e) the reaction is carried out continuously by separately introducing the N,N'-bisimide of formula (I) in a divided solid state, the diamine of formula (II)

in the molten state and the epoxy resin in the liquid state into a mixer provided with an extruder screw.

DETAILED DESCRIPTION OF THE PREFERRED EMBODIMENTS OF THE INVENTION

More particularly according to the present invention, it will be appreciated that either a single bisimide or a mixture of several bisimides may be used. Similarly, the terms polyamine and epoxy resin are intended to also connote mixtures of polyamines and mixtures of epoxy resins.

When compared with the polymers described in French Patent No. 1,555,564, the thermosetting compositions according to the present invention are also distinguished by a free diprimary diamine content which is very markedly reduced. This reduction in the content of free diamine is of great value because certain of such diamines can exhibit a degree of toxicity.

Exemplary of the bisimides of formula (I), particularly representative are:

N,N'-meta-phenylenebismaleimide;
N,N'-para-phenylenebismaleimide;
N,N'-4,4'-diphenylmethanebismaleimide;
N,N'-4,4'-diphenyl ether bismaleimide;
N,N'-4,4'-diphenyl sulfone bismaleimide;
N,N'-1,4-cyclohexylenebismaleimide;
N,N'-4,4'-diphenyl-1,1-cyclohexanebismaleimide;
N,N'-4,4'-diphenyl-2,2-propanebismaleimide;
N,N'-4,4'-triphenylmethanebismaleimide;
N,N'-2-methyl-1,3-phenylenebismaleimide;
N,N'-4-methyl-1,3-phenylenebismaleimide;
N,N'-5-methyl-1,3-phenylenebismaleimide.

These bismaleimides may be prepared according to the processes described in U.S. Pat. No. 3,018,290 and British Patent No. 1,137,290. A preferred bismaleimide is N,N'-4,4'-diphenylmethanebismaleimide, either alone or admixed with N,N'-2-methyl-1,3-phenylenebismaleimide, N,N'-4-methyl-1,3-phenylene-bismaleimide and/or N,N'-5-methyl-1,3-phenylenebismaleimide.

Exemplary of the diamines of formula (II), particularly representative are:

para-phenylenediamine;
meta-phenylenediamine;
4,4'-diaminodiphenylmethane;
2,2-bis(4-aminophenyl)propane;
di(4-aminophenyl) ether;
4,4'-diaminodiphenyl sulfone.

Of the above diamines, 4,4'-diaminodiphenylmethane is the preferred.

As regards the epoxy resin, by the expression "epoxy equivalent weight" is intended the weight of resin (in grams) containing one epoxy group

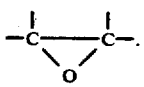

An epoxy resin having an epoxy equivalent weight ranging from 150 to 300 is preferred. Concerning the physical characteristics of this resin, these range from those of liquid resins of low viscosity (approximately $2 \times 10^{-3}$ Pa s at 25° C.) to those of pasty resins having melting points on the order of 60° C. Most preferred are those glycidyl ethers of bis(hydroxyphenyl)alkanes noted under paragraph (c) above, glycidyl ethers of bis(hydroxyphenyl)alkanes brominated on the aromatic nuclei thereof, and mixtures of such epoxy resins.

The amounts of N,N'-bisimide of formula (I), of diamine of formula (II) and of epoxy resin are preferably selected such that the ratio:

$$\frac{\text{number of moles of bisimide}}{\text{number of moles of diamine}}$$

ranges from 2/1 to 4/1; and
the weight of epoxy resin constitutes 15% to 30% of the weight of the combined mixture of bisimide+diamine+epoxy resin.

It may be advantageous to utilize a chlorinated or brominated epoxy resin, the latter being used either alone or mixed with an unchlorinated or unbrominated epoxy resin, when it is desired to produce thermosetting compositions curable into resins having the additional property of being perfectly flameproofed. In this respect, it has unexpectedly been found that the amount of chlorine or bromine contributed by the epoxy resin, or mixture of epoxy resins, in the thermosetting composition according to the invention is of critical nature to impart certain properties to the cured resins, particularly the properties related to heat stability and those related to the adhesion of the resin containing imide and epoxy groups to metals such as, for example, copper. More precisely, this amount of chlorine or of bromine which is contributed by the epoxy resin or the mixture of epoxy resins, expressed as the weight percentage of elemental chlorine or elemental bromine relative to the weight of the combined mixture of bisimide+diamine+epoxy resin(s), represents not more than 6%, as indicated above, and preferably ranges from 2 to 4%. The amount of chlorine or bromine can be easily adjusted to the desired value by using epoxy resins (employed in amounts representing 10 to 40% and preferably 15 to 30% of the combined composition) having a chlorine or bromine content which is higher or lower and/or by starting from mixtures of chlorinated or brominated epoxy resins with unchlorinated or unbrominated epoxy resins.

By the expression "mixer provided an extruder screw" under above paragraph (e) is intended apparatus which does not form any dead zones as the material is advancing therethrough. Apparatus of this type, which may include one or more screws, is described in E. G. Fisher, *Extrusion of Plastics*, pp. 104–108 [Interscience Publishing (1964)]. These mixers may contain two endless screws intermeshing intimately and rotating in the same direction; a machine of this type, equipped more particularly for the preparation of alkali metal terephthalates, is described in French Patent No. 1,462,935. Another variety of mixers which can be employed consists of machines containing an endless screw with interrupted flights producing a rotary motion and an oscillating motion simultaneously in the axial direction, and housed in a barrel comprising teeth which interact with the interrupted fins of the screw. Machines of this type are described in French Patents Nos. 1,184,392, 1,184,393, 1,307,106 and 1,369,283.

For reasons of convenience, it is preferable to employ the bisimide (a) in the form of particles having sizes ranging from 0.1 to 5 mm. Their introduction into the mixer may be regulated by known means for this purpose, such as metering screws or balances.

The diamine (b) is fed in the liquid state into the mixing zone. Its introduction may be carried out by means of a metering pump. Feed of the diamine may be conducted at one or more points, preferably downstream of the bisimide (a) feed zone.

The epoxy resin (c) is introduced into the mixer in the liquid state as well, at one or more points situated downstream of the diamine (b) feed zone.

The maintaining of the mixing zone at the selected temperature of from 90° C. to 200° C., and preferably from 130° C. to 180° C., is generally achieved by controlled heating of the housing of the mixer. In addition, it is also possible to effect a controlled heating of the endless screw or screws in the machine. Insofar as the housing is concerned, the heating may be applied uniformly throughout its length, but it is also possible to arrange a number of adjoining heating zones providing the mixing zone with a temperature which may, for example, increase in the direction of travel of the material It is preferable for the temperature to range from 20° to 130° C. upstream of the point of initial introduction of the diamine (b).

The residence time of the materials in the mixing zone may vary within a certain degree depending on the bisimide, the diamine and the epoxy resin employed, on the temperature adopted and on the weight ratio of the respective reactants. As a general rule, it is on the order of 1 to 30 minutes. At the outlet of the mixer, the softening point of the thermosetting composition obtained can be regulated by heating the latter in an oven under determined temperature and duration conditions. This softening point generally ranges from 60° C. to 130° C.

The thermosetting compositions according to the invention may be employed as such. They may also contain fibrous or powdered fillers. As examples of such fillers, representative are asbestos or glass fibers, mica, silica, alumina, metal particles, aluminum, magnesium and zirconium silicates, calcium carbonate, and particles of synthetic polymers such as polytetrafluoroethylene or fluoro copolymers.

These compositions, in the liquid state or in the form of powder obtained after cooling and grinding of the composition, may be used to produce molded shaped articles (hot molding or compression molding, according to the physical state of the composition). They may also be employed in solution, for example for producing laminated materials based on inorganic, vegetable or synthetic fibers. Such laminates may be used, for example, as printed circuit bases.

The subject compositions may be cured by heating to a temperature which generally ranges from 160° C. to 280° C., and preferably from 180° C. to 250° C. They may advantageously be subjected to a postcure at a temperature of up to 300° C.

In order to further illustrate the present invention and the advantages thereof, the following specific examples are given, it being understood that same are intended only as illustrative and in nowise limitative.

EXAMPLE 1

The apparatus employed was a Buss laboratory mixer referred to as "Ko-Kneader" model PR 46. This mixer comprised an endless screw consisting of a shaft bearing interrupted helical flights, with the interruptions forming separate fins. It was driven by appropriate means. The screw was housed in a body comprising three adjoining jacketed coaxial cylindrical barrels; the inner wall of the mixer body was provided with tooth-shaped projections. The screw was driven with a rotary motion and simultaneously with an oscillating motion in its axial direction, and this created an exchange of material in two directions.

Water at 20° C. was circulated in the first barrel and a fluid heated to 160° C. in the other two. The speed of rotation of the screw was 40 revolutions/minute.

N,N'-4,4'-diphenylmethanebismaleimide was introduced into the first part of the mixer (corresponding to the first barrel) by means of a metering balance at a rate of 1,253 g/hr; the bismaleimide was introduced in the form of particles having an average size on the order of 0.25 mm.

4,4'-Diaminodiphenylmethane, maintained at 110° C., was introduced at a rate of 247 g/hr into the second part of the mixer (corresponding to the second barrel).

The epoxy resin, maintained at 100° C., was introduced at a rate of 500 g/hr into the third part of the mixer (corresponding to the third barrel). The epoxy resin employed was a glycidyl ether obtained by reacting epichlorohydrin with 2,2-bis(4-hydroxyphenyl)propane (or bisphenol A) and having an epoxy equivalent weight of 188. Its viscosity at 25° C. was 10.5 Pa s. Same is available commercially under the registered trademark Araldite, from Ciba, type LY 556. It may be represented by the average formula:

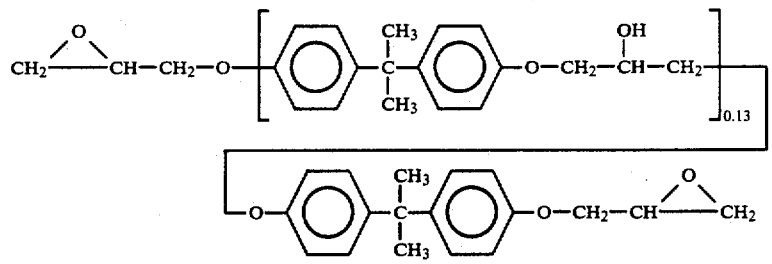

The reactants were metered such that the epoxy resin represented 25% of the weight of the mixture of bismaleimide + diamine + epoxy resin.

The average residence time of the material in the mixer was on the order of 5 minutes. A thermosetting composition whose softening point was 65° C. was collected at the outlet of the apparatus. This composition was processed further by heating in an oven at 165° C. until a softening point of 90° C. was obtained.

The thermosetting composition obtained in this manner was soluble in polar solvents such as, for example, N-methylpyrrolidone and dimethylformamide. Its viscosity, measured in solution at a concentration of 50% by weight in N-methylpyrrolidone, was 0.5 Pa s.

A solution of this composition at a concentration of 50% by weight in N-methylpyrrolidone was employed to coat a glass cloth manufactured by Porcher under the reference 7628, which had a weight per unit area of 200 g/m² and which had been subjected to a treatment with gamma-aminopropyltriethoxysilane (Union Carbide silane A 1100). The impregnated cloth contained 40 g of thermosetting composition per 60 g of cloth. It was dried in a ventilated atmosphere for 10 minutes at 140° C. The residual diamine content, measured on the impregnated cloth, was less than 0.1% by weight (percentage of free diamine relative to the weight of the combination of cloth+impregnating thermosetting composition), whereas it was equal to approximately 1% by weight in the case where the thermosetting composition was prepared as indicated earlier, but in the absence of epoxy resin. 12 squares (15×15 cm) were then cut therefrom and were stacked, and the assembly was placed between the platens of a press, which were preheated to 130° C. A pressure of $40 \times 10^5$ Pa was then applied, and the temperature was then raised to 180° C. over 20 minutes at this same pressure. The assembly was maintained under these temperature and pressure conditions for one hour. The assembly was then demolded hot and was subjected to a postcure for 4 hours at 235° C.

The laminate obtained had an interlamellar strength (measured according to ASTM standard D 2345-65 T) of 65 MPa. Under the same conditions, a laminate produced from a thermosetting composition prepared as indicated above, but in the absence of epoxy resin, had an interlamellar strength of 50 MPa.

To determine the adhesion of copper to a laminate, an additional 6 squares (15×15 cm) of impregnated cloth were cut and stacked with a copper sheet 35 micrometers in thickness, placed on one of the outer face surfaces of the stack, and the assembly was placed between the platens of a press under the conditions described above. After the postcure stage (4 hours at 235° C.), the adhesion of the copper to the 6-layer laminate was examined; this adhesion, measured with a tensometer by pulling the copper at an angle of 90° (according to the standard MIL P 55 617 B) with a pull speed of 55 mm/min., was on the order of 18N/cm. This value was maintained after an aging period of 100 hours at 200° C.

EXAMPLE 2

A thermosetting composition containing 25% by weight of a bromo epoxy resin was prepared under the same conditions as those described in Example 1. This resin was produced by condensation of tetrabromobisphenol A with epichlorohydrin. It had a bromine content of 20% by weight and an epoxy equivalent weight of 220. It is available commercially under the registered trademark Araldite from Ciba, type LY 8047. The quantity of bromine contributed by the epoxy resin, expressed as the weight percentage of elemental bromine relative to the weight of the combined composition of bisimide+diamine+epoxy resin, was equal to 5%.

The thermosetting composition obtained at the outlet of the mixer had a softening point of 70° C. This composition was processed further by heating in an oven at 165° C. until a softening point of 110° C. was obtained.

A first part of the composition obtained was then placed in a cylindrical mold which was placed between the platens of a press which had been preheated to 240° C. A pressure of $200 \times 10^5$ Pa was applied and the temperature of 240° C. was maintained for 1 hour at this same pressure. After demolding, a postcure was carried out for 12 hours at 200° C. The following mechanical properties were then measured:

Flexural strength at 25° C. (according to ISO Standard 178): 120 MPa,

Unnotched Charpy impact strength (according to ISO Standard 179): 8.5 kJ/m².

Under the same conditions, the molded product produced from a thermosetting composition prepared as indicated above, but in the absence of epoxy resin, had an unnotched Charpy impact strength of 6 kJ/m².

A second part of the thermosetting composition obtained earlier was used to prepare prepregs and laminates comprising 6 covers (6 layers of prepregs) under the conditions described in Example 1 (it should be noted that no copper sheet was employed in this case). After a postcure for 4 hours at 235° C., combustibility measurements were carried out using the UL 94 vertical test (thickness of the specimens based on the laminate: 0.8 mm; the combustion time is given in seconds after a conditioning of 48 hours at 23° C. and 50% relative humidity; the classification is established on an average of 10 results: 5 specimens and 2 tests on each specimen):

Combustion time: 3s,

Classification: VO.

The third and last fraction of the thermosetting composition obtained was used to prepare prepregs and copper laminates comprising 6 covers and a sheet of copper 35 micrometers in thickness, the operation being again performed as indicated at the end of Example 1. After the postcure stage (4 hours at 235° C.), the adhesion of the copper to the copper laminate comprising 6 covers was examined under the conditions described earlier in Example 1:

Initial adhesion: 13N/cm,

Adhesion after 100 hours at 200° C.: 9N/cm,

Adhesion after 5 minutes of being subjected to the solder bath test at 285° C.: 0.5N/cm (this test consists in dipping the copper laminate-based specimen into a bath of tin heated to 285° C).

By way of comparison, Example 2 was repeated, but this time using 35% by weight of the brominated epoxy resin Araldite, LY 8047; under these conditions, the quantity of bromine contributed by the epoxy resin, expressed as the weight percentage of elemental bromine relative to the weight of the combined composition of bisimide+diamine+epoxy resin, was equal to 7%.

The thermosetting composition obtained was again used to prepare, according to the method above described, prepregs and copper laminates comprising 6 covers and a copper sheet 35 micrometers in thickness. The postcure of 4 hours at 235° C. was then performed in the usual manner. Upon completion of this postcure, a "blistering" phenomenon (development of blisters) was observed on the copper face of the laminates; this indicated a complete loss of adhesion to copper at a number of points on the surface of the laminates, thus constituting a defect prohibiting the potential applications of the copper laminates.

EXAMPLE 3

The same conditions as those described in Example 2 were used to prepare a thermosetting composition containing 25% by weight of a mixture based on the epoxy resin of Example 1 (Araldite, LY 556; 40% by weight in the mixture) and the bromo epoxy resin of Example 2 (Araldite LY 8047; 60% by weight in the mixture). Under these conditions, the quantity of bromine contributed by the mixture of epoxy resins, expressed as the weight percentage of elemental bromine relative to the weight of the combined composition of bisimide+-diamine+epoxy resins, was equal to 3%.

The thermosetting composition obtained at the outlet of the mixer was processed further by heating in an oven at 165° C. until a softening point of 110° C. was obtained.

This composition was used to prepare prepregs and copper laminates comprising 6 covers and a sheet of copper 35 micrometers in thickness, by following the usual operating procedure. After the postcure stage (4 hours at 235° C.), the adhesion of copper to the laminate was examined under the conditions described in Example 1:

Initial adhesion: 14.7N/cm,

Adhesion after 100 hours at 200° C.: this value was maintained at 14.7N/cm,

Adhesion after 10 minutes of the solder bath test at 285° C.: 12.7N/cm.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A thermosetting composition of matter comprising a copolymerizate of:
   (a) an N,N'-bisimide of the formula:

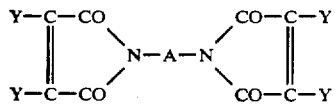

(I)

in which Y is H, CH$_3$ or Cl;

A is cyclohexylene, phenylene, 4-methyl-1,3-phenylene, 2-methyl-1,3-phenylene, 5-methyl-1,3-phenylene, 2,5-diethyl-3-methyl-1,4-phenylene, or a radical of the formula:

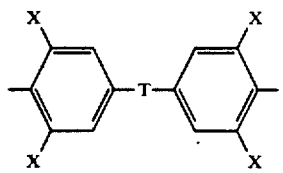

in which T is a single valence bond or a group:

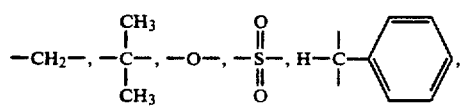

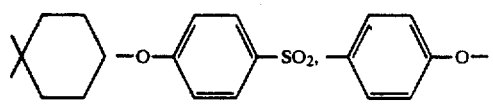

and the symbols X, which are identical or different, are each a hydrogen atom or a methyl, ethyl or isopropyl radical;

(b) a diprimary diamine of the formula:

H$_2$N-B-NH$_2$     (II)

in which the symbol B is one of the divalent radicals represented above by the symbol A, with the proviso that the symbols A and B present in the same polymer may be identical or different; and (c) a chlorinated or brominated epoxy resin having an epoxy equivalent weight ranging from 100 to 500, said resin being taken by itself or mixed with an unchlorinated or unbrominated epoxy resin having an epoxy equivalent weight ranging from 100 to 500, with the proviso that the quantity of chlorine or of bromine contributed by the epoxy resin or the mixture of epoxy resin, expressed as the weight percentage of elemental chlorine or elemental bromine relative to the combined mixture of bisimide, diamine and epoxy resin, is not more than 6%.

2. The thermosetting composition as defined by claim 1, said epoxy resin (c) comprising a glycidyl ether.

3. The thermosetting composition as defined by claim 2, said glycidyl ether comprising the reaction product of chlorohydrin with 2,2-bis(4-hydroxyphenyl)propane, bis(4-hydroxyphenyl)methane, bis(4-hydroxymethylphenyl-methane, bis(4-hydroxyphenyl)-thane, resorcinol, hydroquinone, pyrocatechol dihydroxydiphenyl, or condensation products of said phenols with an aldehyde, or chlorinated or brominated derivatives thereof.

4. The thermosetting composition as defined by claim 3, wherein (d) the amount of N,N'-bisimide of formula (I) and of diamine of formula (II) is such that the ratio:

$$\frac{\text{number of moles of bisimide}}{\text{number of moles of diamine}}$$

ranges from 1.2/1 to 20/1; and the amount of epoxy resin constitutes from 10% to 40% of the weight of the combined mixture of bisimide+diamine+epoxy resin.

5. The thermosetting composition as defined by claim 4, said glycidyl ether comprising a chlorinated or brominated epoxy resin, and wherein the amount of chlorine or bromine contributed thereby, expressed as the weight percentage of elemental chlorine or elemental bromine relative to the weight of the combined mixture of bisimide+diamine+epoxy resin, is not more than 6%.

6. The thermosetting composition as defined by claim 1, further comprising a reinforcing amount of filler material.

7. The composition of matter as defined by claim 1, in cured state.

8. A shaped article comprising the thermosetting composition as defined by claim 1.

9. A shaped article comprising the thermoset composition as defined by claim 7.

10. A process for the preparation of the thermosetting composition as defined by claim 1, comprising continuously copolymerizing particulate bisimide (I), molten diamine (II) and liquid epoxy resin (c).

11. The process as defined by claim 10, conducted in a mixer provided with an extruder screw.

12. The process as defined by claim 11, said mixer comprising an endless screw with interrupted flights simultaneously translating a rotary motion and an oscillating motion in the axial direction and housed in a barrel comprising teeth which interact with the interrupted fins of the screw.

13. The process as defined by claim 11, wherein the diamine (b) and the epoxy resin (c) are charged into the mixer downstream of the bisimide (a) feed zone.

* * * * *